Patented Oct. 29, 1929

1,733,298

UNITED STATES PATENT OFFICE

RAGNAR ECKERMANN, OF STOCKHOLM, SWEDEN

METHOD FOR DECREASING THE TOXIC ACTION OF COCAINES

No Drawing. Application filed June 26, 1926, Serial No. 118,356, and in Sweden March 13, 1926.

Ever since the cocaine appeared in the medical world in the sixth decade of the nineteenth century experiments have been made to find a method for decreasing its toxic action while maintaining its excellent local anæsthetic properties.

All these experiments, which have been continued during a period of time of about 50 years, have failed. When one has succeeded in decreasing the toxic action, the local anæsthetic effect has also disappeared, and therefore hitherto local anæsthesia and toxic action have been identical ideas for persons skilled in the art.

Further, cocaine cannot be sterilized by heating at 100° C. without decomposition owing to the influence of the alkali of the glass.

The present invention has for its object to provide a new method for decreasing the toxic action of cocaines, which method is therapeutically wholly satisfactory while multiplying at the same time the local anæsthetic effect.

The method according to the invention consists in subjecting a cocaine salt to the influence of an organic compound having at least one radical identical with one of the radicals of said cocaine salt, subjecting a urethane to the influence of an organic compound having at least one radical identical with one of the radicals of said urethane and mixing the cocaine salt thus treated with the urethane thus treated with or without supplying heat.

The organic compounds above referred to, acting as modifiers of the cocaine salt and urethane, may consist of an organic acid or base, mono-valent or multivalent alcohols, phenols, or mixtures thereof.

If said reaction agents are liquid, they may serve at the same time as solvents. Preferably, the quantity of the reaction agents used for dissolving the cocaine and the urethane respectively and for rendering the reaction possible should be as small as possible, said quantity being determined by experiments. In order to obtain the preparation as free as possible from said chemical auxiliary agents, the product obtained is subjected to heating at 125° C. in which case amongst said groups of reaction agents such substances should be chosen which volatilize at or below said temperature as, for instance, guanidine or ethyl alcohol. The product may also be purified by distillation with steam, until an oil-like sediment precipitates which is insoluble in water, in which case among said reaction agents such substances, of course, should be selected which will volatilize with steam at a temperature below 125° C. as, for instance, benzoic acid or phenol.

Besides small quantities of by-products, a modified cocaine preparation is obtained, the properties of which differ in all essential respects from the cocaine or from cocaine derivatives hitherto known, and further the product obtained will stand heating actions up to 125° C. without being decomposed.

Instead of a cocaine salt a cocaine derivative may be used and a urethane salt or derivative may be substituted for the urethane salt. However, the best results are obtained by using cocaine-hydrochloride ($C_{17}H_{21}O_4N \cdot HCl$) and phenyl-urethane ($C_9H_{11}O_2N$). Preferably 2 parts by weight of cocaine-hydrochloride are mixed with 1 part by weight of phenyl-urethane, the cocaine-hydrochloride having been treated with a solution of benzoic acid in ethyl alcohol in the proportion 1:3000, whereas, the phenyl-urethane having been treated with a solution of phenol in ethyl alcohol in the proportion of 1:3000.

*Example*

280 grams of a solution of benzoic acid in ethyl alcohol (1:3000) are added to 50 grams cocaine hydrochloride, and 30 grams of a solution of phenol in ethyl alcohol (1:3000) are added to 25 grams phenyl urethane, said solutions being mixed while being well stirred and heated to about 70° C. The final product is distilled with steam at 125° C. in order to volatilize the reaction agents and by-products which may have been formed.

What I claim as new and desire to secure by Letters Patent of the United States of America is:—

1. A method for decreasing the toxic action of cocaines, consisting of subjecting cocaine hydrochloride ($C_{17}H_{21}O_4N \cdot HCl$) to the influence of a solution of benzoic acid in ethyl alcohol, subjecting phenyl-urethane ($C_9H_{11}O_2N$) to the influence of a solution of phenol in ethyl alcohol, mixing the cocaine hydrochloride thus treated with the phenyl-urethane thus treated and distilling the mixture with steam at a temperature of about 125° C.

2. A method for decreasing the toxic action of cocaines, consisting of subjecting cocaine hydrochloride ($C_{17}H_{21}O_4N \cdot HCl$) to the influence of a solution of benzoic acid in ethyl alcohol in the proportion 1 : 3000, subjecting phenyl-urethane ($C_9H_{11}O_2N$) to the influence of a solution of phenol in ethyl alcohol in the proportion of 1 : 3000, mixing 2 parts by weight of the cocaine hydrochloride thus treated with 1 part by weight of the phenyl-urethane thus treated and distilling the mixture with steam at a temperature of about 125° C.

3. A method for decreasing the toxic action of cocaines, consisting in subjecting a cocaine salt to the influence of an organic compound having at least one radical identical with one of the radicals of said cocaine salt and a boiling point below 125° C., subjecting a urethane to the influence of an organic compound having at least one radical identical with one of the radicals of said urethane and a boiling point below 125° C., mixing the cocaine salt thus treated with the urethane thus treated, and heating said mixture to about 125° C.

4. A method for decreasing the toxic action of cocaines, consisting in subjecting a cocaine salt to the influence of an organic compound having at least one radical identical with one of the radicals of said cocaine salt and volatilizable with steam at a temperature below 125° C., subjecting a urethane to the influence of an organic compound having at least one radical identical with one of the radicals of said urethane and volatilizable with steam at a temperature below 125° C., mixing the cocaine salt thus treated with the urethane thus treated, and distilling the mixture with steam at a temperature of about 125° C., until an oil-like sediment precipitates.

In testimony whereof I affix my signature.

RAGNAR ECKERMANN.